(12) United States Patent
Gutendorf

(10) Patent No.: US 7,323,885 B2
(45) Date of Patent: Jan. 29, 2008

(54) CAPACITIVE SENSOR AND DETECTION DEVICE WITH CAPACITIVE SENSORS FOR THE DETECTION OF AN OBSTRUCTION SITUATION

(75) Inventor: Peter Gutendorf, Osnabruck (DE)

(73) Assignee: Wilhelm Karmann GmbH, Osnabruck (DE)

( * ) Notice: Subject to any disclaimer, the term of this patent is extended or adjusted under 35 U.S.C. 154(b) by 0 days.

(21) Appl. No.: 10/531,826

(22) PCT Filed: Oct. 17, 2003

(86) PCT No.: PCT/DE03/03443

§ 371 (c)(1),
(2), (4) Date: Oct. 12, 2005

(87) PCT Pub. No.: WO2004/038149

PCT Pub. Date: May 6, 2004

(65) Prior Publication Data

US 2006/0139036 A1   Jun. 29, 2006

(30) Foreign Application Priority Data

Oct. 18, 2002  (DE) ................................ 102 48 761

(51) Int. Cl.
G01R 27/26 (2006.01)
(52) U.S. Cl. .................. 324/663; 324/662; 324/686
(58) Field of Classification Search ................ 324/663, 324/662, 686
See application file for complete search history.

(56) References Cited

U.S. PATENT DOCUMENTS

| | | | |
|---|---|---|---|
| 6,191,593 B1* | 2/2001 | Tartagni et al. ............. | 324/687 |
| 6,208,101 B1 | 3/2001 | Seeberger et al. | |
| 6,240,722 B1 | 6/2001 | Busch et al. | |
| 6,377,009 B1* | 4/2002 | Philipp ........................ | 318/468 |
| 6,600,284 B1* | 7/2003 | Weber et al. ................ | 318/466 |
| 6,750,624 B2* | 6/2004 | Haag et al. .................. | 318/468 |
| 2002/0030666 A1* | 3/2002 | Philipp ........................ | 345/168 |
| 2002/0101210 A1* | 8/2002 | Boisvert et al. ............. | 318/469 |
| 2003/0085679 A1* | 5/2003 | Bledin et al. ................ | 318/264 |

FOREIGN PATENT DOCUMENTS

| | | |
|---|---|---|
| DE | 31 37 351 A1 | 4/1983 |
| DE | 32 36 056 A1 | 3/1984 |
| DE | 35 27 405 A1 | 2/1987 |
| DE | 40 11 901 A1 | 10/1991 |
| DE | 197 24 168 C1 | 8/1998 |
| DE | 101 04 333 A1 | 8/2002 |

* cited by examiner

Primary Examiner—Andrew H. Hirshfeld
Assistant Examiner—Amy He
(74) Attorney, Agent, or Firm—Gifford, Krass, Sprinkle, Anderson & Citkowski, P.C.

(57) ABSTRACT

A capacitive sensor, in particular for the detection of an obstruction of objects or body parts by motor driven devices, includes an arrangement of a multitude of electrodes on a support and means to measure a capacitance or a capacitance change. The sensor is of a flat and film-like embodiment with a support made out of a film material for the arrangement of the electrodes. Furthermore, a capacitive sensor system, for detection of an obstruction situation of objects or body parts with motor driven devices uses several sensors of the above design, is disclosed, whereby an obstruction situation is detected, if a selection of several sensors is responding.

9 Claims, 3 Drawing Sheets

CAPACITIVE SENSOR AND DETECTION DEVICE WITH CAPACITIVE SENSORS FOR THE DETECTION OF AN OBSTRUCTION SITUATION

REFERENCE TO RELATED APPLICATION

This application is a U.S. national phase filing under 35 U.S.C. §371 of Patent Cooperation Treaty No. PCT/DE2003/003443, filed Oct. 17, 2003, which claims priority to German Patent Application No. 10248761.8, filed Oct. 18, 2002, the entire content of all of which are incorporated herein by reference.

FIELD OF THE INVENTION

The present invention relates to a capacitive sensor with an arrangement of a multitude of electrodes on a support and with means to measure a capacitance or a capacitance change. Furthermore, the invention concerns a detection device with a capacitive sensor system for the detection of an obstruction of objects or body parts in motor driven devices comprising several capacitive sensors according to the invention.

BACKGROUND OF THE INVENTION

With power-operated devices there is always the risk that objects or body parts are caught, which can cause damage to objects or injury to people. Since the use of motor driven devices is becoming more prevalent in order to enhance comfort, for example in doors, windows, and shutters in building services engineering or in windows, sliding roofs, and convertible tops in automotive engineering, an early and reliable detection of an obstruction situation becomes increasingly important, since the movement of those devices often takes place automatically and without being monitored by an operator.

For example, newer convertible vehicles are often equipped with a movable convertible top, which can be automatically moved for example from an open to a closed position or vice versa with the push of a button. The movement of the convertible top is usually effected by a hydraulic drive, which in turn drives a convertible top mechanism, which includes a convertible top linkage. The linkage may support for a textile roof or a so-called hard-top folding roof with mainly rigid roof elements, and may include a cover for a convertible top compartment as well as all elements that are being moved in the process by the described parts.

Furthermore it is common knowledge to provide a detection device with capacitive sensors in order to recognize an intervention into the range of motion of a motor driven device such as the convertible top.

Such an obstruction sensor with a capacitive sensor system is described in German Patent Application DE 198 36 056 A1, whereby the device that is being used to detect the obstructions, in particular when automatically closing convertible tops, vehicle windows or the like includes a capacitive sensor device, which consists of an electroconductive transmitter surface on one side and an electroconductive sensor wire and at least one metal surface that is mainly potential-free on the other side of an insulator. The transmitter surface and the sensor wire are connected to an electronic analysis circuit in the process.

However, the disadvantage of these kinds of obstruction sensor devices that operate with a capacitive sensor system is that they require a relatively large installation space and thus can not be used in all safety-relevant areas, which has the result that an obstruction situation may not be detected until very late in the process when making contact with the object that interferes with the range of motion, whereupon a corresponding reaction can be triggered.

German Patent Application DE 101 04 333 A1 describes a convertible vehicle with a convertible top which can be folded into a storage compartment, whereby the storage compartment is located in a rear part of the vehicle adjacent to a trunk and is separated from the trunk by means of a variable separation device. The separation device is movable between a convertible top storage position in which it limits the additional space and increases the storage compartment space, and a luggage storage position in which it limits the additional space and increases the trunk space, whereby the separation device comprises at least one movable plate element.

A capacitive sensor comprising a multitude of flat films is mounted on the plate element in order to avoid an obstruction in the additional space during convertible top movement. This type of sensor comprises two foils or plates arranged parallel to each other with a dielectric between. The dielectric is made out of a mechanically robust as well as elastically deformable material such as foamed material. A deformation of the sensor and thus a change of the distance between the foils or plates which can be measured as a change in capacitance that takes place when the sensor contacts a piece of luggage.

Although such a film-like sensor has the advantage to be flat in comparison with other sensors, the sensor needs to contact an obstacle in the path of motion. Therefore, also with this solution a reaction is late, especially in regard to an obstruction protection for body parts.

German Patent Application DE 40 11 901 A1 describes another capacitive sensor responding upon pressure, whereby a change in capacitance resulting from a deformation of two parallel plates is measured.

Other capacitive sensors are known from German Patent Publications DE19724168C1, DE19805928A1, and DE3236056A1.

SUMMARY OF THE INVENTION

It is the object of the present invention to provide a capacitive measuring sensor, which can also be used when there is little installation space available and permits a contact-less detection of an object that is endangered to get into an obstruction situation, and to provide a detection device with a capacitive sensor system, which makes it possible to detect an interference into the range of motion of a motor-driven device in all safety-relevant areas, whereby detection should take place reliably and as early as possible.

According to the invention, this object is solved with a capacitive sensor with the features described herein and a detection device with the features described herein.

The capacitive measuring sensor according to the invention, which is shaped flat and film-like using a support made of film material for the arrangement of the electrodes, whereby the electrodes are arranged on one side of the support and ambient air is used as the dielectric in order to achieve a contact-less detection of an object or a body part, has the advantage that it only requires very little installation space and that it can be also placed into difficult installation spaces because it can be deformed in all directions. It has the further advantage that it permits contact-less obstruction detection due to the dielectric change created by the air, which makes the sensor most suitable for the obstruction detection in the path of motion of a convertible's top.

The detection device according to the invention, with a capacitive sensor system for detecting whether objects or body parts are caught in motor driven devices with several capacitive sensors according to the invention, has the advantage that a clear distinction can be made between a capacitance change of all sensors that is caused by ambient conditions, e.g., due to a change in air humidity, and a capacitance change due to an interference into the range of motion of the device, whereby only a selection of the capacitive measuring sensors that are being used are responding. The presence of an obstruction situation can therefore be reliably detected.

The reliability of the output signal can be further increased by evaluating the dynamics of the capacitance change.

When they are advantageously used for a convertible top, the capacitive measuring sensors are appropriately located in critical areas of convertible top movement, such as in the area of elements that are connected with each other by hinge-like connections such as elements of the convertible top linkage and/or a tensioning bow and/or a convertible top compartment cover and/or a windshield frame and/or an area adjacent to a window. The space-saving arrangement between a sealing section and/or a trim part and its support is particularly advantageous.

To ensure reliable obstruction protection even if there is a malfunction in the sensor system that is operating based on a certain measuring principle or if an obstruction situation is not detected or not detected in time, it is advantageous if the capacitive sensor system of the detection device described in the invention interacts with a sensor system that operates based on a different measuring principle in order to recognize an intervention into the range of motion of the convertible top mechanism, whereby the convertible top movement is controlled in safety mode via a control device after recognizing a fault in the detection device or after detecting an obstruction situation. The transition into safety mode when the convertible top mechanism is actuated, by which a convertible top linkage and a convertible top compartment cover, and if equipped with the related movable elements, is to be understood, ensures a reaction that is geared towards the particular operating situation, which can consist of continuing the convertible top movement with reduced speed or stopping or reversing the convertible top movement.

An example of another sensor system operating based on a different measuring principle is an optical sensor system.

Additional advantages and advantageous features of the invention will be readily understood after reading the description, the drawings, and the patent claims.

The drawings include a schematic of an application example of the invention, which will be explained in further detail in the following description.

DETAILED DESCRIPTION OF THE INVENTION

Figure 1:
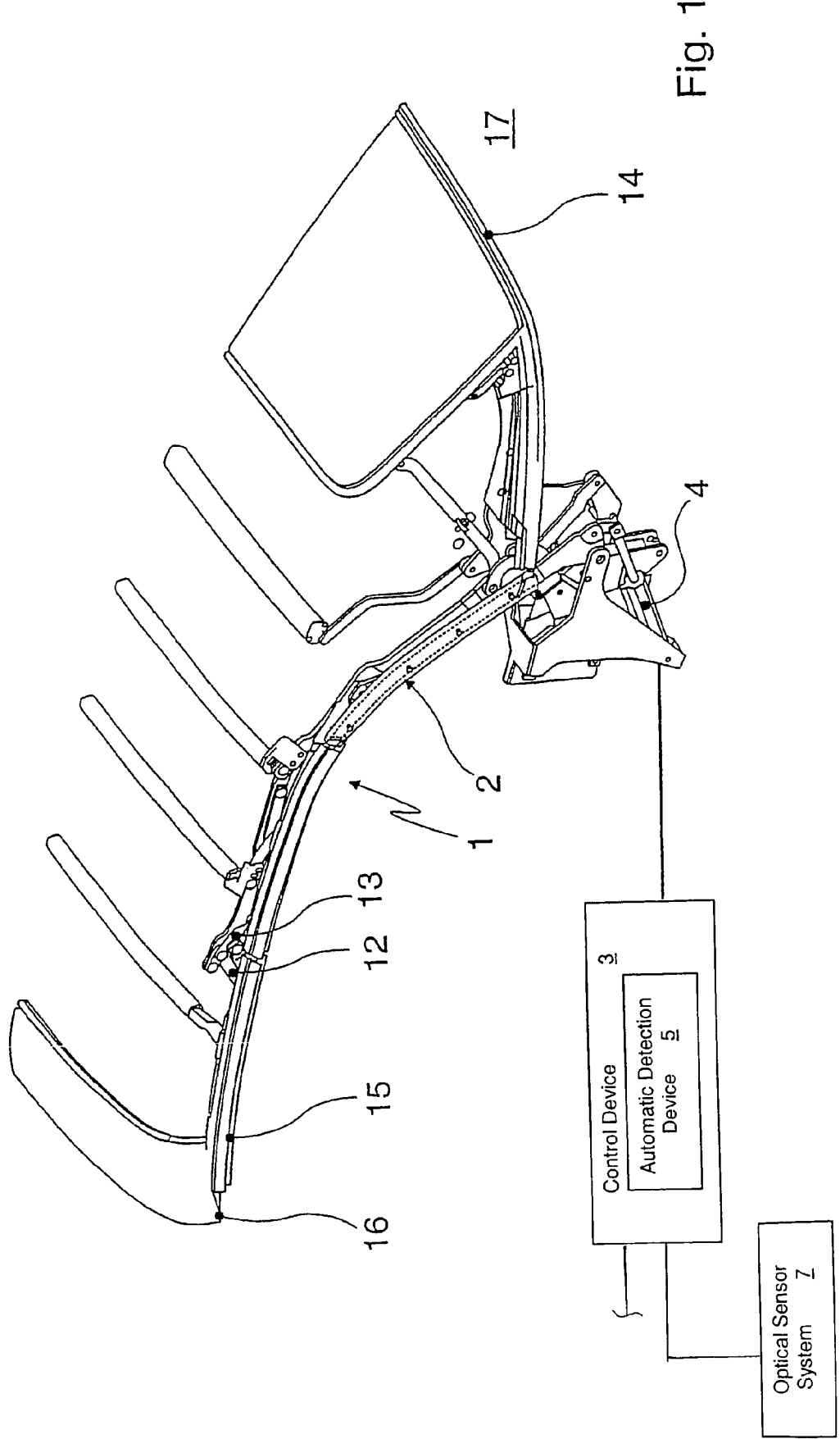
FIG. 1 a schematic view of only the convertible top of a convertible vehicle.

FIG. 1 shows a movable convertible top 1 of a convertible. The convertible top 1 includes a convertible top mechanism 2, which can be moved between an open and a closed position with the aid of a control device 3 representing a convertible top control unit and an electro-hydraulic convertible top drive 4, of which only sections are shown in FIG. 1.

To be able to reliably carry out the automatic convertible top movement without the intervention of the vehicle user and without the user's supervision, an automatic detection device 5 is provided for the detection of an interference into the range of motion of the convertible top mechanism 2, which is here integrated into the convertible top control unit 3 in terms of the electronic analysis unit.

Figure 2:
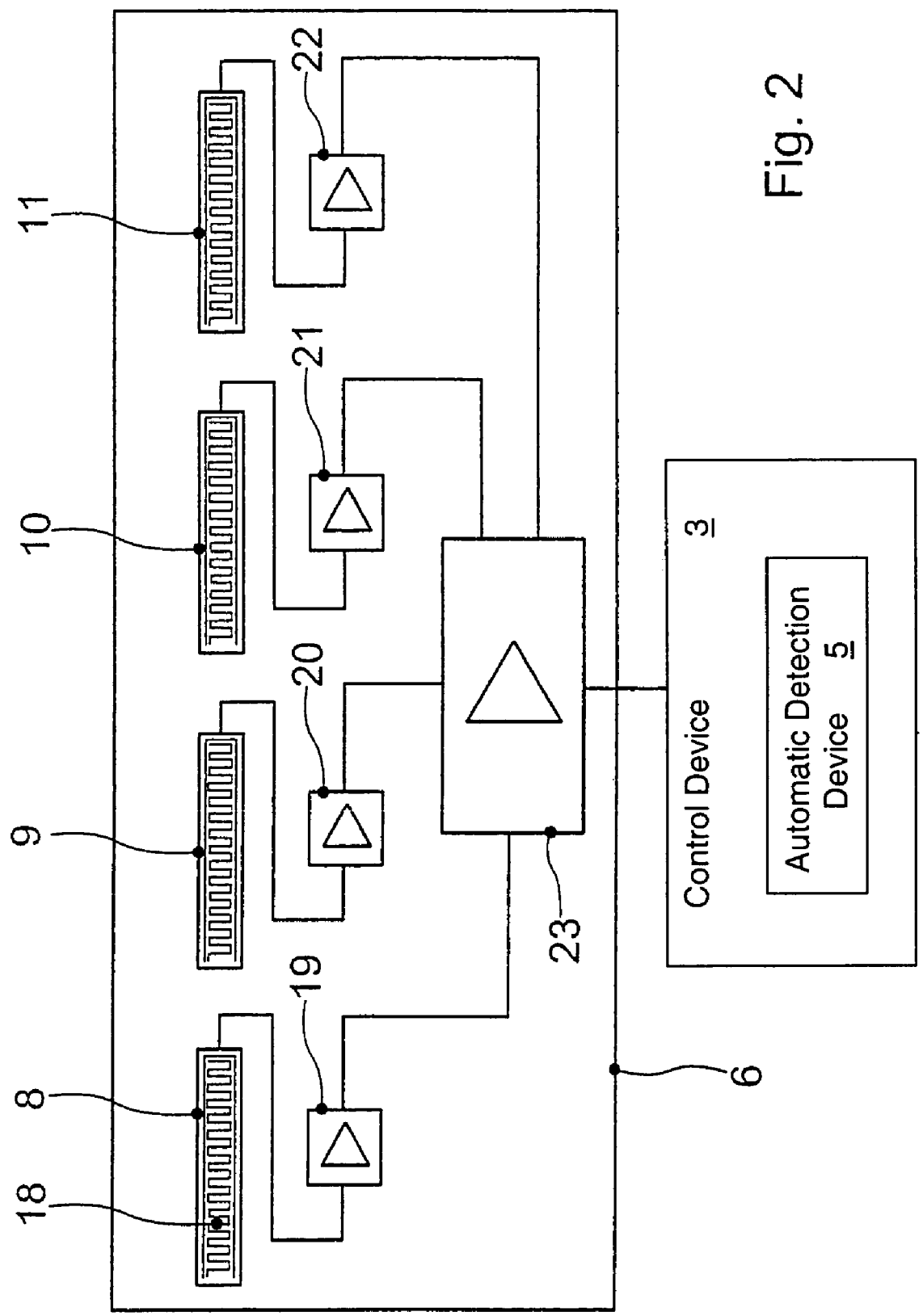
FIG. 2 is a diagrammatic Figure of the design of a capacitive sensor system of a detection device.

The detection device 5 comprises a sensor system with sensors that carry out measurements based on different measurement principles, whereby part of the sensor system is designed as a capacitive sensor system 6 as shown in FIG. 2.

The presented capacitive sensor system 6 permits contactless obstruction recognition and is therefore particularly suited as part of a multisensor system, such as the sensor system of the detection device 5, which comprises, in addition to the capacitive sensor system 6, an optical sensor system 7 that is shown only symbolically in FIG. 1.

FIG. 2 shows in principle a possible design of the capacitive sensor system 6, which has several capacitive sensors, a selection of which are shown with the capacitive sensors 8, 9, 10, and 11 in FIG. 2.

In the shown version, the capacitive sensors 8 to 11 are each located in a critical area of the convertible top mechanism 2, such as in an area of elements 12, 13 which are connected with each other by hinges-like connections shown in FIG. 1, and which are elements of the convertible top linkage, a tensioning bow 14, an area 15 next to a window, an area 16 abutting to a windshield frame and in an abutting range for a convertible top compartment cover, for which reference 17 shows the mounting area in FIG. 1.

As shown schematically in FIG. 2, each of the present capacitive sensors 8 to 11 is designed as a flat, film-like sensor, on which electrodes 18 are located on a support of film material. The special structure of the conductor tracks on this film results in a capacitive sensor, which on one side of the film reacts upon a dielectric change, which is air for the capacitive sensors 8 to 11. Thus, capacitance is changing when an object or a body part approaches, which is converted into an analog voltage signal in an integrated electronic circuit for further processing in the control unit 3 of the convertible top 1.

As appears from FIG. 2, the film-like sensors 8 to 11 are each connected to the convertible top control unit 3 via an amplifier or transistor 19, 20, 21, 22, whereby an automatically readjusting amplifier threshold switch 23 is provided between the transistors 19 to 22 and the convertible top control unit 3 in the depicted version. The re-adjustable amplifier 23 for instance causes, in the event of a sharp increase of air humidity in the environment, such as in the event of contact with snow, an offset (change) of the switch point (zero-point) of all sensors, so that a body part such as a finger can be detected even through snow. The amplifier circuits 19 to 22 that are allocated to individual sensors 8 to 11 are also arranged on the film material.

The capacitive sensor films 8 to 11, which are mounted between sealings or trim parts of the convertible top mechanism 2 and their support as far as possible, are able to detect a foreign object at a distance of up to 60 mm for example.

To rule out that the system is being triggered erroneously due to external influences, the sensors 8 to 11 that are used are compared, and the plausibility of their signals is checked by an appropriate electronic analysis device of the detection device 5 or the convertible top control unit 3. In the event of a capacitance change of all capacitive sensors the system assumes that the environmental influences have changed, whereby an obstruction situation is detected when the capacitance changes in a selection of the capacitive sensors.

Figure 3:
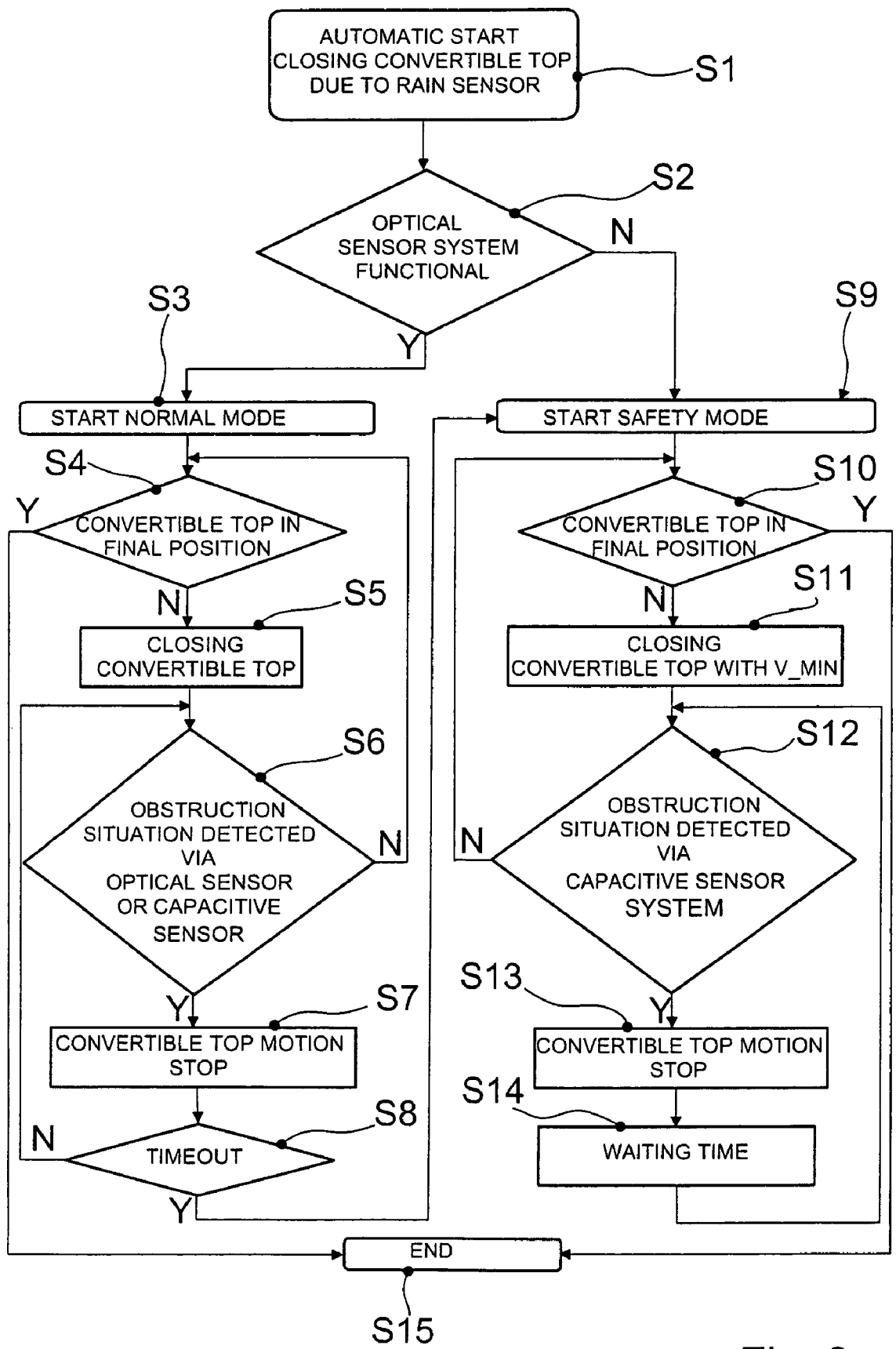
FIG. 3 is a flow chart of a normal mode and a safety mode for the control of a convertible top movement with the aid of the capacitive sensor system.

As soon as a fault is detected in detection device 5 or the previously described sensor system detects an obstruction situation during the convertible top motion, the convertible top motion is controlled in safety mode, which is shown in further detail in FIG. 3, and in which the convertible top motion continues with reduced speed and power, is stopped, or is reversed in part or completely.

As appears from the flow chart in FIG. 3, an automatic start of the convertible top motion is triggered in order to close the convertible top 1 in a first step S1, when in the described example a defined amount of water is detected by a rain sensor.

After the start of the automatic convertible top motion, in a second step S2 is checked, whether the present optical sensor system 7 is functional. If the system is functional, a processing function S3 defined for normal mode is started, in which normal mode convertible top mechanism 2 is driven with maximum power and speed.

In the process, an inquiry function S4 constantly checks whether the convertible top 1 has already reached the final position. If this is the case, the system proceeds with a processing function S15 that ends the monitoring function. Otherwise, the convertible top 1 continues with the closing motion with the aid of a further processing function S5, whereby the system permanently uses an inquiry function S6 to check during the motion, whether an obstruction is detected using the optical or the capacitive or another sensor system.

In the event of a positive inquiry result of inquiry function S6, in other words when an obstruction situation is detected, the convertible top motion is stopped at first by means of a subsequent processing function S7 and a waiting time is started. An inquiry function S8, which is also called "Timeout" function, is used to check whether the obstruction situation is still present while the convertible top motion is stopped.

If the obstruction situation is no longer present, the system returns to inquiry function S4 in order to check whether the final position of the convertible top 1 has been reached, otherwise a continuing convertible top motion is permitted via function S5.

If the result of inquiry function S8 is that the obstruction situation is still present after the waiting time has ended and while the convertible top motion is stopped, the system is started in safety mode by a processing function S9. This safety mode is also started if inquiry function S2 detects that the optical sensor system 7 is not functional immediately after the automatic convertible top motion starts.

After starting in safety mode, an inquiry function S10 checks, as in normal mode, whether convertible top 1 has reached its final position. If this is already the case, the system branches off to function S15, which ends the monitoring function. Otherwise, the convertible top motion continues via a processing function S11 with reduced speed v_min, whereby an inquiry function S12 is used to check during this decelerated convertible top motion whether an obstruction situation is detected via the capacitive sensor system 6. If this is not the case, the system returns to inquiry function S10 and the convertible top is closed with reduced speed until it has reached its final position.

If an obstruction situation is detected by inquiry function S12 in safety mode, the convertible top motion is stopped or reversed using a processing function S13 depending on the severity of the obstruction situation, whereby a waiting time is started in a further step S14, during which the system checks whether the obstruction situation is still present. As long as this is the case, the convertible top motion remains stopped or reversed.

With the aid of the safety mode it can be ruled out that the automatic function of the convertible top motion is not started due to a single error and that the vehicle is possibly damaged as a result if applicable. On the other hand, an adequate reaction is triggered immediately in the event of a clear obstruction situation.

It shall be understood that the presented capacitive measuring sensor can be equipped with any arrangement of electrodes that is suitable for the particular application and the capacitive sensor system can be used, with the corresponding modifications, for numerous other applications such as in building services engineering or automotive engineering.

The invention claimed is:

1. A detection system for detecting whether objects or body parts are obstructing a motor driven device, the system comprising:
   a plurality of sensors, each sensor including:
      a generally flat and film-like support;
      a multitude of electrodes arranged on one side of the support; and
      a means to measure a capacitance or a capacitance change;
      wherein ambient air represents the dielectric;
   a control in communication with the plurality of sensors, the control indicating a change in ambient conditions when all of the plurality of sensors measure a capacitance change and the control indicating an obstruction situation when less than all of the plurality of sensors measure a capacitance change; and
   wherein each of the plurality of sensors can be deformed in all directions for installation.

2. A system according to claim 1, wherein each sensor further comprises an automatically readjusting threshold switch.

3. A system according to claim 1, wherein the motor driven device, for which an obstruction of objects or body parts is detected, is a convertible top of a convertible vehicle.

4. A system according to claim 3, wherein the sensors are located in the area of elements that are connected with each other by hinge-like connections and that are elements selected from a group consisting of a convertible top linkage, a tensioning bow, a convertible top compartment cover, a windshield frame, and an area adjacent to a window.

5. A system according to claim 3, wherein one of the sensors is located between a sealing section or trim part and a support.

6. A system according to claim 3, further comprising an additional sensor system that uses measurements based on a different measuring principle in order to detect an interference into the range of motion of the convertible top mechanism wherein, after a malfunction of the sensor system or an obstruction situation is recognized, the convertible top motion is controlled by a control device in a safety mode, in which the convertible top motion continues with reduced speed and power or is stopped or reversed.

7. A system according to claim 6, wherein the additional sensor system comprises an optical sensor system.

8. A system according to claim 7, wherein the safety mode is started when a malfunction is recognized in the optical sensor system.

9. A system according to claim 1, wherein the support of at least one of the sensors is mounted to an element of a convertible top.

* * * * *